United States Patent
Sarin

(10) Patent No.: US 12,475,446 B2
(45) Date of Patent: *Nov. 18, 2025

(54) AUTOMATED DATA TOKENIZATION THROUGH NETWORKED SENSORS

(71) Applicant: PayPal, Inc., San Jose, CA (US)

(72) Inventor: Pankaj Sarin, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,794

(22) Filed: Apr. 22, 2024

(65) Prior Publication Data

US 2024/0394684 A1  Nov. 28, 2024

Related U.S. Application Data

(63) Continuation of application No. 17/537,052, filed on Nov. 29, 2021, now Pat. No. 11,989,717, which is a
(Continued)

(51) Int. Cl.
*G06Q 20/32* (2012.01)
*G06Q 20/36* (2012.01)
(Continued)

(52) U.S. Cl.
CPC ..... *G06Q 20/3224* (2013.01); *G06Q 20/3226* (2013.01); *G06Q 20/3672* (2013.01);
(Continued)

(58) Field of Classification Search
CPC .......... G06Q 20/3224; G06Q 20/3226; G06Q 20/3672; G06Q 20/3829; G06Q 20/4014; H04W 4/021
See application file for complete search history.

(56) References Cited

U.S. PATENT DOCUMENTS 10,089,619 B1   10/2018   Koeppel et al.
10,713,670 B1    7/2020   Moon et al.
(Continued)

FOREIGN PATENT DOCUMENTS

CN   105612543 A   5/2016
CN   105960776 A   9/2016
(Continued)

OTHER PUBLICATIONS

Extended European Search Report for Application No. 19899602.7 mailed on Jan. 20, 2022, 5 pages.
(Continued)

*Primary Examiner* — Patrick Mcatee
*Assistant Examiner* — Zesheng Xiao
(74) *Attorney, Agent, or Firm* — Haynes and Boone, LLP

(57) ABSTRACT

There are provided systems and methods for automated data tokenization through networked sensors. A network of data sensors may detect that a user is likely to engage in electronic transaction processing with a merchant device, for example, based on an action performed by the user and/or with a user device. One or more of the sensors may connect with the user's device and retrieve financial data from the device and/or data necessary to issue a token to the device for transaction processing. The sensor may perform a background process to issue the token to the device, and once onboarded, may store the token to the user's device and/or the merchant device that the user is likely to interact with for transaction processing. The token may be limited in use by location and/or amount, or may be used to fully onboard the user with the token service provider.

20 Claims, 5 Drawing Sheets

Related U.S. Application Data continuation of application No. 16/226,531, filed on Dec. 19, 2018, now Pat. No. 11,232,429.

(51) Int. Cl.
*G06Q 20/38* (2012.01)
*G06Q 20/40* (2012.01)
*H04W 4/021* (2018.01)

(52) U.S. Cl.
CPC ..... *G06Q 20/3829* (2013.01); *G06Q 20/4014* (2013.01); *H04W 4/021* (2013.01)

(56) References Cited

U.S. PATENT DOCUMENTS

| | | |
|---|---|---|
| 2010/0276484 A1 | 11/2010 | Banerjee et al. |
| 2013/0132274 A1 | 5/2013 | Henderson et al. |
| 2014/0006194 A1 | 1/2014 | Xie et al. |
| 2014/0143146 A1 | 5/2014 | Passanha et al. |
| 2014/0149293 A1 | 5/2014 | Laracey |
| 2014/0279444 A1 | 9/2014 | Kassemi et al. |
| 2015/0006378 A1 | 1/2015 | Blythe |
| 2015/0058224 A1 | 2/2015 | Gaddam et al. |
| 2015/0100495 A1* | 4/2015 | Salama ............ G06Q 20/10 705/65 |
| 2015/0120502 A1 | 4/2015 | Jung et al. |
| 2015/0254635 A1 | 9/2015 | Bondesen et al. |
| 2016/0078444 A1 | 3/2016 | Tomasofsky et al. |
| 2016/0283918 A1 | 9/2016 | Weinflash |
| 2017/0083898 A1 | 3/2017 | Sidhu et al. |
| 2017/0098209 A1 | 4/2017 | Laracey et al. |
| 2017/0098211 A1 | 4/2017 | Killoran, Jr. et al. |
| 2017/0148011 A1 | 5/2017 | Killoran, Jr. et al. |
| 2017/0358043 A1 | 12/2017 | Joynt et al. |
| 2018/0018660 A1 | 1/2018 | Gomes et al. |
| 2018/0225720 A1* | 8/2018 | Singh ............ G06Q 30/0269 |
| 2021/0049634 A1 | 2/2021 | Ericson |

FOREIGN PATENT DOCUMENTS

| | | |
|---|---|---|
| CN | 106464492 A | 2/2017 |
| CN | 107533701 A | 1/2018 |
| GB | 2311395 A | 9/1997 |
| JP | 2004272668 A | 9/2004 |
| JP | 2012230619 A | 11/2012 |
| WO | 0127723 A1 | 4/2001 |
| WO | 2015025490 A1 | 2/2015 |

OTHER PUBLICATIONS

International Preliminary Report on Patentability for Application No. PCT/US2019/067677 mailed on Jul. 1, 2021, 8 pages.

International Search Report and Written Opinion for Application No. PCT/US2019/067677 mailed on Mar. 9, 2020, 10 pages.

Marforio C., et al., "Smartphones as Practical and Secure Location Verification Tokens for Payments," Retrieved from Internet URL: https://www.researchgate.net/profile/Srdjan_Capkun/publication/269197156_Smartphones_as_Practical_and_Secure_Location_Verification_Tokens_for_Payments/links/584dd1e008aecb6bd8c9b4b6/Smartphones-as-Practical-and-Secure-Location-Verification-Tokens-for-Payments.pdf, Jan. 2014, 16 pages.

Office Action for Chinese Application No. 201980084829.5 mailed on Oct. 28, 2023, 13 pages.

Yaeli A., et al., "Understanding Customer Behavior Using Indoor Location Analysis and Visualization," IBM Journal of Research and Development, Retrieved from Internet URL: https://www.researchgate.net/profile/Avi_Yaeli/publication/269222059_Understanding_customer_behavior_using_indoor_location_analysis_and_visualization/links/5547796e0cf2e2031b36b9bc/Understanding-customer-behavior-using-indoor-location-analysis-and-visualization.pdf, Sep. 2014, 21 pages.

* cited by examiner

AUTOMATED DATA TOKENIZATION THROUGH NETWORKED SENSORS

CROSS REFERENCE TO RELATED APPLICATIONS

This application is a Continuation of U.S. patent application Ser. No. 17/537,052, filed Nov. 29, 2021, which is a Continuation of U.S. patent application Ser. No. 16/226,531, filed Dec. 19, 2018, now U.S. Pat. No. 11,232,429, which are incorporated by reference in their entirety.

TECHNICAL FIELD

The present application generally relates to data tokenization and more particularly to automatically tokenizing data necessary for location-based electronic transaction processing.

BACKGROUND

Users may utilize computing devices to perform electronic transaction processing with other devices, such as merchant devices at a merchant location. In order to secure sensitive financial data during transaction processing, a token may be issued for that data, where the token does not reveal the financial data. Instead, a backend tokenization process allows for retrieval of the sensitive data during transaction processing but does not allow for bad actors to determine the data from the token itself. To use these processes, a user is required to onboard with a token service provider, which may take time and require active user input. Thus, some users may forego onboarding to receive tokens, which may prevent the user from performing secure transaction processing.

Figure 1:
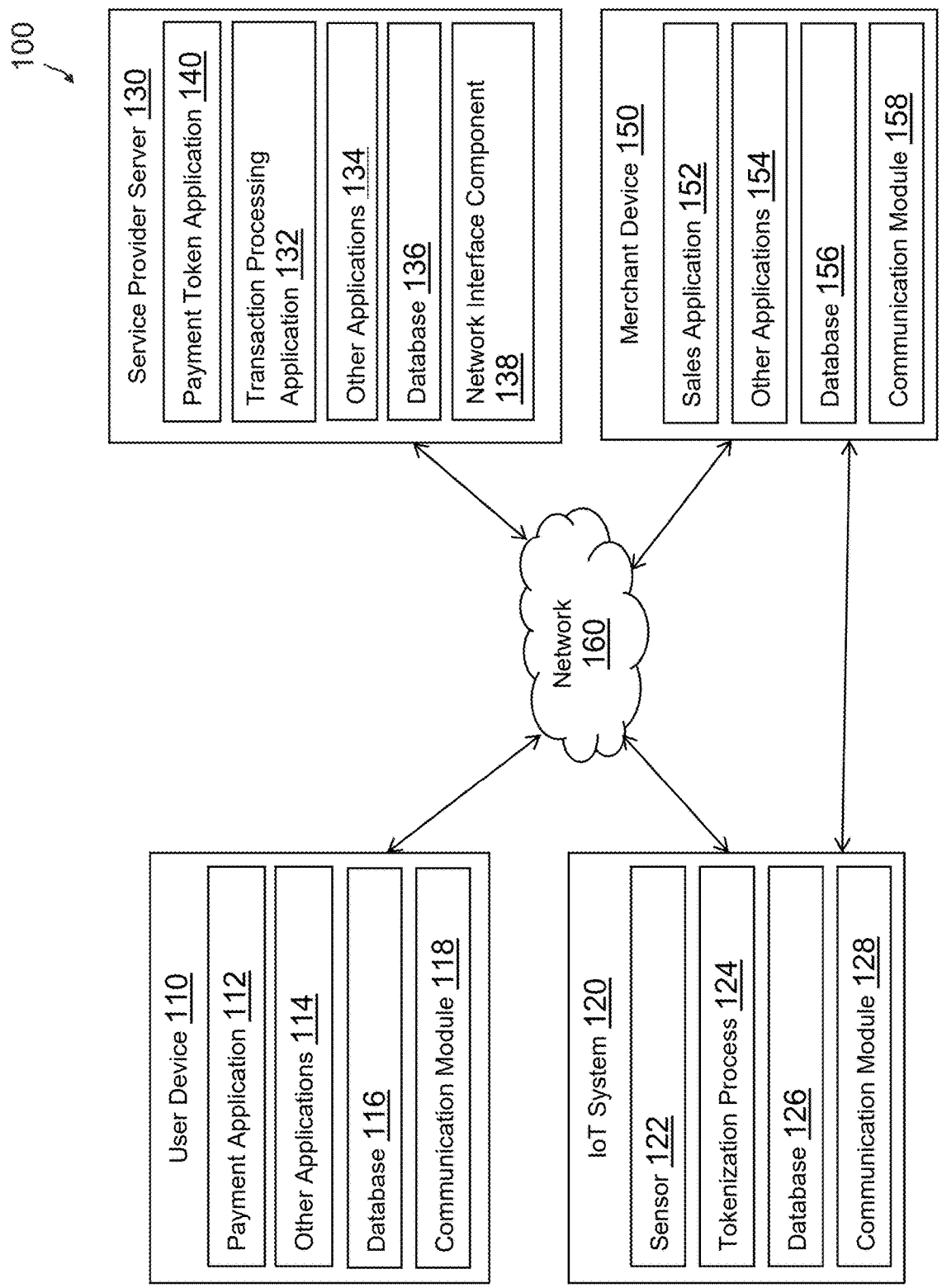
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automated data tokenization through networked sensors. Systems suitable for practicing methods of the present disclosure are also provided.

Networked data sensors may be incorporated in many types of devices, locations, and objects to provide a network of embedded sensors. For example, the Internet of Things (IoT) may correspond to a broad network of systems, sensors, applications, and devices that function together to monitor real-world data. In this regard, the network of sensors may be capable of detecting user data for a user, such as a location of the user, motion or movement performed by the user, voice data of the user, and/or action that the user takes with an item or device (e.g., by moving, picking up, or otherwise handling the item/device). For example, the sensors may include motion sensors, cameras, microphones, or any other type of device that may be capable of detecting user information and communicating with devices. The networked sensors may also be capable of communicating with a device of the user to send and receive data, as well as detect data on the device (e.g., whether the user has a token stored on the device for transaction processing, a process executing on the device, and/or financial data stored on the device). The networked sensors may be incorporated within a network that may communicate with other service providers and entities, such as a tokenization system provided by a token service provider and a merchant device at a merchant location.

In this regard, the network of sensors may be used to determine if a user is about to or likely to engage in electronic transaction processing, and may further communicate with the user's device to issue a token used for transaction processing. This may be done in response to determining that the user is not currently onboarded with another service provider for electronic transaction processing, such as Google Pay® or PayPal®, when the user is likely to checkout and pay at a merchant location. In some examples, the sensor may detect one or more of a distance between the user's device and a merchant device used to checkout and pay for items, a presence of the user at a checkout/payment location, a motion of the user or their device within the checkout location, an action taken by the user or with their device, data on a display screen of the user's device, voice data of the user, movement of the user, or an item in possession of the user. For example, if the user is approaching a checkout location with an item in their possession, the sensor may detect one or more pieces of the data above, and based on the detected data, identify that the user is likely to pay for that item at the location. The user may also may make a statement that identifies that the user is about to pay, such as "I'd like to purchase this" or "Please check me out for this item." The user may also bring out their device when the user approaches the location, which may indicate that the user would like to purchase some item through electronic transaction processing using their device. This data may therefore meet one or more required events or triggers that cause tokenization of data. The token may also be issued before the user is about to engage in transaction processing, such as when the user enters a store location even if the user may not be ready for checkout. In some embodiments, a score may be determined based on the user and/or device data to determine if the user is likely to checkout based on the aforementioned data detectable by the sensor. Thus, if the score exceeds some threshold level, the networked sensor system may determine that the user is likely to checkout.

In response to determining that the user is likely to engage in transaction processing at the merchant location, the sensor may communicate with the user's device to determine that the user is not currently onboarded with a merchant-accepted token provider for electronic transaction processing, such as by querying a database of the user device for a token or token storage confirmation. The network of sensors may also use other user information to determine that the user is not onboarded with any token service provider or with a token service provider accepted by the merchant, such as an identity of the user determined through information stored on the device or detectable through the sensors (e.g., a user image used for image matching and/or facial recognition and querying whether the determined used identity is available with the token service provider). In some embodiments, the device may have a token available for electronic transaction processing stored on the device, however, the token may not be accepted by the merchant and the data may be required to be retokenized to a token and/or data format accepted by the merchant through their partnered token service provider and transaction processing system.

If the user is not onboarded with the token service provider, the network of sensors may request information necessary to onboard the user with the token service provider accepted by the merchant for transaction processing between the user's device and the merchant's device. For example, a wireless communication device of the system of sensors may request information stored on the device, such as financial information (e.g., a payment card, bank account, etc.), user personal information, and/or a token that needs to be retokenized using an accepted token service provider for the merchant. The request may be transmitted to the device by the communicator for the networked sensors. Additionally, the communicator may provide a token, digital certificate, or other authorization data to the user's device that verifies the communicator as valid for tokenization of the data and not compromised or a bad actor requesting the information. For example, where the networked sensors may be part of Google® IoT devices, the digital certificate may validate the sensors as being associated with Google® and/or Google Pay®.

The user's device may perform a background operation in response to the request to transmit the requested data back to the communicator. Such an operation may be performed without user input so that the user is not required to actively request the token from the token service provider through a device application or process. The data provided to the communicator may correspond to the requesting payment or financial data, such as a card number for a credit/debit card. The data may also correspond to information necessary to retrieve the financial data, such as personal information, application data, and/or another token (e.g., one that is not accepted by the merchant). The data provided to the communicator by the user's device may include multiple payment instruments or sources or other financial data, where the networked sensor system and/or tokenization system may select one or more of the instruments based on available rewards, available balances, and/or other loyalty information available for the purchase and/or merchant location. In other embodiments, the user's device may select the financial data for tokenization based on a user preference, available rewards, available balances, and/or loyalty information, which may be specific to the merchant location. In some embodiments, the user may be required to perform an authentication step, or another user may be required to authenticate the user for tokenization of financial data, such as if the user is not a primary account holder of funding source data. Thus, the networked system may require an authentication step up by the user or another user prior to tokenization of the financial data for the funding source. The information may be encrypted using a negotiated mechanism, and may be transmitted secure to the communicator for processing. Additionally, other information may also be provided to the communicator, such as personal information necessary for onboarding the user with a token service provider, loyalty information available at the merchant location, card usage information for selection of a funding source, and/or other data utilized for electronic transaction processing.

In order to determine the token service provider used for tokenization of the financial data, the networked system, merchant, and/or user device may provide and/or process one or more preferences and/or rules for data tokenization. In some embodiments, the IoT system may be affiliated with or part of a specific token service provider, which may do the issuance. However, in other embodiments, the IoT system and/or a service provider connected with the IoT system may be another service provider, such as a transaction processor, which requests generation of the token from another token service provider (e.g., Google Pay®) that is connected to the IoT system. For example, the user and/or merchant may prefer a certain tokenization service for electronic transaction processing, which may be used for selection. In other embodiments, the token service provider may be selected to activate an in-store discount and/or apply merchant specific membership rewards (e.g., Google Pay® with a grocery store chain points). The token service provider may also be selected based on rules and orchestration with the rules to provide for transaction processing. For example, a risk or security rule for a particular location, merchant, or user may cause a specific token service provider to be selected. In some embodiments, if long latency may occur due to network processing delays or other factors, a token may be requested from a token service provider that allows for latency-based processing. Latency-based may correspond to a standard token processing that accounts for latency in a network when issuing the token and receiving the token during transaction processing. In some embodiments, only certain token service providers may provide latency-based processing and therefore specific token service providers may be selected for data tokenization based on system requirements. The token service provider may also be selected based on other rules for transaction processing with the merchant and/or by the user, including rules associated with token lifetime, security, and/or maximum value.

After selection of the token service provider, a token may be requested by the networked sensor system for the user's financial data. The token may also be generated based on one or more rules, as well as a predicted transaction size range. For example, a standard token representing the financial information that allows for transaction processing using the financial data may be generated, having a lifetime (e.g., minutes, hours, days, etc.). The token may also be limited or otherwise generated. In the latency-based token example above, a token may be generated to avoid transaction failures or declines where the user device, merchant device, and/or network may have some longer latency or delays during transaction processing. The token may also be generated for a maximum amount allowed for transaction processing as a security based on risk rules for the system and/or financial information. For example, a funding source may have a maximum amount allowed for transaction processing or may be limited based on the user's transaction history or funding source provider's risk rules. The token may also be limited based on a predicted spend amount at the merchant location by the user. The predicted maximum spend may be based on previous user purchases, items detected in possession of the user for checkout and payment at the merchant location, known inventory and/or spending habits/patterns for the merchant location, voice data detected of one or more items, or other information. In some embodiments, multiple different funding sources may be tokenized, each with a corresponding maximum amount, time, and/or geographic limit based on the user's preferences, available rewards, balances, and/or loyalty information. The token may be valid for an amount of time and/or value, and may allow for electronic transaction processing when received with transaction data. The token may also be generated with other limitations, including a limitation on location of use of the token, devices using the token, and/or transaction with which the token may be used for processing.

After issuing the token for the user's financial information, the token service provider may then share the token with one or more devices used for electronic transaction processing. In some embodiments, the token may be sent back to the sensor, communicator, and/or device that detected the user in a purchasing experience. The sensor may locally store the token until a transaction is initiated and/or ready for processing at the merchant device. At this time, the sensor device of the networked sensor system may then transmit the token to one or more of the merchant device or the user device for processing with transaction data for the transaction. The sensor may also be capable of retrieve the transaction data generated by the user device or the merchant device, and may transmit the transaction data with the token to the token service provider or another transaction processor for processing. In some embodiments, the token service provider may transmit the token to the merchant device and/or the user device, which may store the token for use in processing with a transaction once transaction data is generated. If the token is stored on the user device, the token may be valid for multiple transactions and/or with multiple merchants. The token may onboard the user with the service provider so that the user's device may now use the token for transaction processing. Additionally, the token service provider may onboard the user based on the financial data, a device identifier for the user device, and/or user personal information, so that in the future, the user device may request tokens issued for the financial data and perform electronic transaction processing.

After issuing the token, a transaction may then occur at the merchant location. The transaction data may be generated by the merchant device based on input, such as scanning one or more item bar/QR codes, entering an identifier for the item, or otherwise entering item data to the device. The transaction data may be transmitted to the user device through communications between the user device and the merchant device. In some embodiments, the user device may generate the transaction data. Once generated, the token may be applied to the transaction, and the transaction data and token may be transmitted to the token service provider and/or another payment service provider that provides electronic transaction processing. The service provider may process the transaction data by retrieving the financial data using the token, and may provide a payment from an account of the user associated with the financial data to the account of the merchant. The user device and/or merchant device may then receive the results of transaction processing, and may output a transaction history and/or receipt.

Thus, a network of data sensors, such as the IoT network, may be capable of issuing just-in-time tokens for user financial data to onboard the user with a token service provider without requiring the user to go through a lengthy onboarding process, and prior to the user engage in transactions processing. Due to the limited usage of the token and the detection of the user in a purchasing experience using the sensors, financial data may be tokenized to secure the data while still providing the benefits of the financial data for transaction processing at the merchant location. The automated process eliminates user input and processing, while increasing security through detection of the user in the purchase experience. Moreover, the IoT sensor may independently communicate with the user device and token service provider, and store token data that may be pushed to another device, thereby reducing data processing and communications required by a user device and/or merchant device.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 110, an IoT system 120, a service provider server 130, and a merchant device 150 in communication over a network 160. User device 110 may be utilized by a user to perform electronic transaction processing with a merchant associated with merchant device 150 for one or more items at a physical location, such as at a merchant store. IT system 120 may operate to detect that the user is in a buying or purchasing experience or opportunity using one or more sensors, such as when the user is likely to engage in a transaction in the near future. For example, IoT system 120 may detect data of the user at a checkout location associated with merchant device 150. IoT system may retrieve user financial data based on the potential for transaction processing, and issue a token for the data using service provider server 130. The token may then be stored on IoT system 120 and/or pushed by IoT system 120 to user device 110 and/or merchant device 150 for electronic transaction processing.

User device 110, IoT system 120, service provider server 130, and merchant device 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented as a communication device that may utilize appropriate hardware and software configured for wired and/or wireless communication with service provider server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

User device 110 of FIG. 1 contains a payment application 112, other applications 114, a database 116, and a communication module 118. Payment application 112 and other applications 114 may correspond to executable processes, procedures, and/or applications with associated hardware. In other embodiments, user device 110 may include additional or different modules having specialized hardware and/or software as required.

Payment application 112 may correspond to one or more processes to execute software modules and associated devices of user device 110 to process electronic transactions over a network with one or more other services and/or users, including an electronic transaction using a token issued to user device 110 for financial data by IoT system 120 with service provider server 130. In this regard, payment application 112 may correspond to specialized hardware and/or software utilized by a user of user device 110 that may be used to access a website or an interface of a merchant or service provider that allows user device 110 to enter or receive transaction data, provide an account, financial data, or a digital token used to pay for the transaction data, and instruct service provider server 130 to perform transaction processing. In some embodiments, instead the digital token may be transmitted to merchant device 150 for processing without user device 110. Payment application 112 may utilize one or more user interfaces, such as graphical user interfaces presented using an output display device of user device 110, to enable the user associated with user device 110 to enter and store financial information that may be retrieved and tokenized by IoT system 120. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 150, including retrieving website information (e.g., a website for service provider server 130), presenting the website information to the user, and/or communicating information to the website, including payment information for transaction processed through service provider server 130. However, in other embodiments, payment application 112 may include a dedicated application of service provider server 130 or other entity (e.g., a merchant), which may be configured to assist in processing transactions electronically, including transactions processed using the digital token. The interface(s) providing by payment application 112 may be utilized to engage in electronic transaction processing, including online or virtual purchases and/or purchases at a physical merchant location.

Payment application 112 may be used to provide information that indicates a user is likely to engage in a transaction. For example, payment application may be opened when a user is about to engage in a transaction, or a process may be executed on user device 110 that indicates that the user is about to engage in transaction processing, such as an authentication process to open or unlock user device 110 and/or a connection process with merchant device 150 for an exchange of transaction information. Payment application 112 may communicate the information to IoT system 120 for issuance of a token. Additionally, financial information accessible by payment application 112 may be transmitted to IoT system 120 in response to a request for the information to issue a token. Payment application 112 may validate IoT system 112 prior to transmission of the financial system, such as through a digital certificate, handshake, or other process that validates IoT system 120 is not attempting to fraudulently acquire the financial information. In response to transmitting the financial information to IoT system 120, payment application 112 may receive a token used for payments.

During transaction processing, payment application 112 may be utilized to select payment instrument(s) for use in providing payment for a purchase transaction, transfer, or other financial process. As discussed herein, payment application 112 may utilize user financial information, such as credit card data, bank account data, or other funding source data, as a payment instrument when providing payment information. Additionally, payment application 112 may utilize a digital wallet stored with an account with a payment provider, such as service provider server 130, as the payment instrument, for example, through accessing a digital wallet or account of a user with service provider server 130 through entry of authentication credentials and/or by providing a data token that allows for processing using the account. Payment application 112 may utilize a digital token for the payment account, digital wallet, and/or payment instruments by providing the digital token to authenticate the user and/or use the user's payment account, digital wallet, and/or payment instruments, which may be encrypted and/or provided through a secure channel, to a transaction participant. The digital token may be issued to user device 110 by IoT system 120, and may authenticate an account, digital wallet, and/or payment instruments to service provider server 130 and allow for transaction processing and payment using the account, digital wallet, and/or payment instruments.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may include a browser application, dedicated application of a service provider or merchant, and/or financial application. Other applications 114 may also include email, texting, voice and IM applications that allow a user to send and receive emails, calls, texts, and other notifications through network 160. Other applications 114 may also include other location detection applications, which may be used to determine a location for user device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display components capable of displaying information to users and other output components, including speakers.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with payment application 112 and/or other applications 114, identifiers associated with hardware of user device 110, or other appropriate identifiers, such as identifiers used for payment/user/device authentication or identification, which may be communicated as identifying the user/user device 110 to service provider server 130. Moreover, database 116 may include received tokens issued to user device 110 for financial information by IT system 120.

User device 110 includes at least one communication module 118 adapted to communicate with IoT system 120, service provider server 130, merchant device 150 and/or another nearby device within range of communication module 118. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using wireless communications, such as Bluetooth Low Energy, LTE Direct, WiFi, radio frequency, infrared, Bluetooth, and near field communications.

IoT system 120 may be maintained, for example, by an online service provider, which may provide a network of connected sensors, devices, and communicators that function to track real-world data, communicate with devices, and issue just-in-time payment tokens for financial information when a user is detected as in a potential buying experience. In this regard, IoT system 120 includes one or more sensors and processing applications which may be configured to interact with user device 110 and/or another device/server to facilitate detection of the user in the buying/purchase experience and issuing a token for the user's financial information where the user is not onboarded with service provider server 130 for data tokenization and/or does not have a token on user device 110. In one example, IoT system 120 may be provided by PAYPAL®, Inc. of San Jose, CA, USA. However, in other embodiments, IoT system 120 may be maintained by or include another type of service provider, which may provide data detection and tokenization services to a plurality of users.

IoT system 120 of FIG. 1 includes a sensor 122, a tokenization process 124, a database 126, and a network interface component 138. Tokenization process 124 and other applications 134 may correspond to executable processes, procedures, and/or applications with associated hardware. In other embodiments, IoT system 120 may include additional or different modules having specialized hardware and/or software as required.

Sensor 122 may correspond to a data sensor capable of detecting user data of a user and determining, based on the user data, that the user is likely to engage in a transaction with merchant device 150 for one or more items at a merchant location. In various embodiments, sensor 122 may include a camera, which corresponds to an optical device of user device 110 enabling IoT system 120 to capture or record images, including still and/or video images, of a user. Sensor 122 may correspond to a digital camera or may more generally correspond to any device capable of capturing or recording an image, video, or other digital media data, including infrared imaging or other types imaging devices. As a digital camera, sensor 122 may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of sensor 122 may include various features, such as zoom, flash, focus correction, shutter speed controls, or other various features usable to capture one or more images or videos of the user and/or other users or objects.

In certain embodiments, sensor 122 may include a location detection component capable of detecting a location of user device 110, for example, through a GPS locator and service, triangulation process, mapping application, check-in process/feature, wireless communications, or other location detection process. Sensor 122 may be used to determine a location of user device 110 and/or the user associated with user device 110. Moreover, the location and/or location parameters may be determined by sensor 122 to determine whether the user is located in an area associated with transaction processing. Sensor 122 may include other media capture components, including a microphone to capture audio data. A microphone of sensor 122 may be used to capture voice data of the user. Sensor 122 may further include other types of sensors that may capture data of the user and/or user device 110, such as a motion capture component and/or a data sensor and communicator that may capture processes being executed by user device 110. Sensor 122 may also include software components that may interact with the hardware components to facilitate data determination, such as radar and camera controllers.

Tokenization process 124 may correspond to one or more processes to execute modules and associated specialized hardware of IoT system 120 to determine that a user associated with user device 110 is in a buying experience and/or likely to process a transaction with merchant device 150, and issue a token for user device 110 for use in transaction processing. In this regard, tokenization process 124 may correspond to specialized hardware and/or software to receive and/or detect user data for the user using sensor 122, such as a location of the user, one or more images or videos of the user, voice data of the user, and/or other user data that may indicate that the user is likely to engage in a transaction with merchant device 150. For example, an image or detected location of the user within a checkout location for merchant device 150 may indicate that the user will engage in transaction processing. The user may also be captured in data that indicates the user is holding an item for purchase, or has made statements that the user wishes to purchase an item. The user data may also include actions or motions the user performs, such as taking out a wallet, placing an item in a basket, placing the item on a countertop for purchase, or other motion. The user data may also be a motion, action, or process performed with user device 110, such as pulling user device 110 out of a pocket or bag, unlocking user device 110, opening an application on user device 110, and/or inputting data to a process of user device 110. The user data with user device 110 may also be a distance between user device 110 and merchant device 150 and/or a wireless communication between user device 110 and merchant device 150. The user data may also indicate user device 110 is moving toward merchant device 150 to indicate an impending transaction. Additional data, such as calendar data or other device, may be used to as well, such as an indication the user is shopping for a particular item or for a particular occasion, such that the user is more likely to make a purchase at the location. In some embodiments, multiple different pieces of data may be captured by sensor 122, and a score may be calculated of the likelihood that the user will engage in the transaction, which may be required to meet a threshold.

Once the user is detected as within a buying experience, tokenization process 124 may request financial data from user device 110 for tokenization. The request may be accompanied with a token, one time password, digital certificate, or other data that may identify IoT system 120 as being trusted for tokenization of the financial data. User device 110 may validate IoT system 120 and transmit the financial information to IoT system 120 for tokenization by tokenization process 124. In some embodiments, the financial information may correspond to one or more funding source, where the funding sources may be selected based on rewards, balances, and/or risk/processing rules. In other embodiments, the financial data may correspond to other data necessary to fetch the financial data, such as another token used with a token service provider that is not supported by merchant device 150 for transaction processing and/or personal information for the user to retrieve the financial data. User device 110, tokenization process 124, and/or service provider server 130 may determine the financial data for tokenization based on rewards, balances, and/or rules, and may transmit the financial data to service provider server 130 for processing and tokenization. Tokenization system 120 may select service provider server 130 for tokenization of the financial information based on user/merchant preferences and/or availability/compatibility of processing tokens provided by service provider server 130. Service provider server 130 may also be selected based on processing rules for the token.

The token may then be issued based on one or more rules and/or limitations of usage of the token, such as a time, amount, and/or location of usage of the token. Tokenization process 124 may then store the token in database 126 and/or push the token to user device 110 and/or merchant device 150 for processing with a transaction. If stored locally in database 126, tokenization process 124 may await generation of transaction data, and may apply the token to the transaction of electronic transaction processing. Additionally, tokenization process 124 may push the token to user device 110 and/or merchant device 150 for processing with the generated transaction data. Tokenization process 124 may onboard the user with service provider server 130 for future receipt of tokens used for transaction processing, for example, by providing personal information and/or device identifiers needed to retrieve future tokens and generating an account with service provider server 130 for token generation.

Additionally, IoT system 120 includes database 126. Database 126 may store various identifiers associated with user device 110 and/or IoT system 120. Database 126 may also store user data, which may be detected by sensor 122, and associated processing that determine whether the user associated with the user data is likely to engage in a transaction with merchant device 150. Database 126 may also store received tokens, which may be pushed to user device 110 and/or merchant device 15 during electronic transaction processing.

IoT system 120 includes at least one communication module 128 adapted to communicate with user device 110, service provider server 130, merchant device 150 and/or another nearby device within range of communication module 128. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with nearby devices using wireless communications, such as Bluetooth Low Energy, LTE Direct, WiFi, radio frequency, infrared, Bluetooth, and near field communications.

Service provider server 130 may be maintained, for example, by an online service provider, which may provide tokenization services for user financial data and electronic transaction processing of transactions using issued tokens. In this regard, service provider server 130 includes one or more processing applications which may be configured to interact with user device 110, IoT system 120, and/or merchant device 150 to issue a token based on detected user data, transmit the token to one or more of user device 110, IoT system 120, and/or merchant device 150, and process a transaction using the token. In one example, service provider server 130 may be provided by PAYPAL®, Inc. of San Jose, CA, USA. However, in other embodiments, service provider server 130 may be maintained by or include another type of service provider, which may provide authentication services to a plurality of users.

Service provider server 130 of FIG. 1 includes a payment token application 140, a transaction processing application 132, other applications 134, a database 136, and a network interface component 138. Transaction processing application 132, other applications 134, and payment token application 140 may correspond to executable processes, procedures, and/or applications with associated hardware. In other embodiments, service provider server 130 may include additional or different modules having specialized hardware and/or software as required.

Payment token application 140 may correspond to one or more processes to execute modules and associated specialized hardware of service provider server 130 to receive financial data for a user and issue a token for the financial data. In this regard, payment token application 140 may correspond to specialized hardware and/or software to receive financial information in response to determining that a user likely to engage in a transaction with merchant device 150. As discussed herein, IoT system 120 may detect user data, and in response to the user data indicating that the user will likely engage in a transaction (e.g., due to the proximity or location of the user with respect to merchant device 150 and/or a checkout location, or some activity performed by the user and/or with user device 110 and/or merchant device 150), transmit the user financial data pulled from user device 110 by IoT system 120 to payment token application 140. In some embodiments, payment token application 140 may receive the user data necessary to determine whether the user is in a buying experience and likely to perform transaction processing. Thus, in some embodiments, payment token application 140 may perform the determination of when to tokenize financial data from user device 110.

Once the financial data is received, payment token application 140 may tokenize the financial data by storing the financial data and generating or issuing a digital data token that represents the financial information. In some embodiments, a token service provider other than service provider server 130 may be engaged by payment token application 140 to issue the token, such as Google Pay® or other separate token provider. The token data and/or look up reference may be stored in database 156 and used to retrieve the financial information when the token is received during transaction processing. Thus, transaction processing application 132 may utilize the reference table(s) to determine the financial information and perform transaction processing using the financial information for transaction data received with the token. Additionally, payment token application 140 may issue the token with limitations and/or rules on use based on business and risk rules of service provider server 130, where the business and/or risk rules provide a time, location, and/or amount limitation on the token such as an expiration date or a purchase limit for the token. The token may be issued to also refer or provide benefits available to the user, such as loyalty data stored to user device 110. In some embodiments, payment token application 140 may select one or more funding sources or other data of the financial information to specifically tokenize based on rewards, benefits, and/or compatibility of the financial information with a token service provider and/or merchant device 150. Service provider server 130 and/or the data token may be selected and issued based on other rule orchestrations required by the transaction processing system, such as a latency-based payment token where the transaction processing over network 160 may encounter latency issues and/or processing delays.

Transaction processing application 132 may correspond to one or more processes to execute modules and associated specialized hardware of service provider server 130 to process a transaction through a received token, where the transaction may include transaction data generated by user device 110 and/or merchant device 150. In this regard, transaction processing application 132 may correspond to specialized hardware and/or software used by a user associated with user device 110 to establish a payment account and/or issue a token for financial information with transaction processing application 132 by providing personal and/or financial information to service provider server 130 through IoT system 120. In various embodiments, the financial information may include payment instrument information, such as account/card numbers and information. The digital token may be used to send and process payments, for example, by referring to financial information stored in database 136 when the token is issued by payment token application 140, and processing a payment using the financial information. In some embodiments, the financial information may also be used to establish a payment account. The payment account may be accessed and/or used through a browser application and/or dedicated payment application executed by user device 110, and engage in transaction processing through transaction processing application 132.

In some embodiments, user device 110 and/or merchant device 150 may generate transaction data, and may communicate with transaction processing application 132 to process the transaction with a token issued by payment token application 140. Transaction processing application 132 may retrieve the financial information using the token, and may process a payment using the financial information to an account of the merchant associated with merchant device 150. Transaction processing application 132 may process the payment, and may provide a transaction history to user device 110 and/or merchant device 150 for transaction authorization, approval, or denial. Transaction processing application 140 may also process the transaction using one or more rules, as well as terms and/or limitations on the token and/or financial information. Additionally, transaction processing application may apply any rewards and/or loyalty benefits available to the user to the transaction, where such benefits are not applied directly by user device 110 and/or merchant device 150.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI), configured to provide an interface to the user when accessing service provider server 130, where the user or other users may interact with the GUI to more easily view and communicate information. In various embodiments, other applications 134 may include additional connection and/or communication applications, which may be utilized to communicate information to over network 160.

Additionally, service provider server 130 includes database 136. Database 136 may store various identifiers associated with user device 110. Database 136 may also store account data, including payment instruments and authentication credentials, as well as transaction processing histories and data for processed transactions. Database 136 may store financial information and tokenization data, such as tokens and look up references to determine financial information from a token when received. The tokenization data may be stored with the limitations and rules on use of the tokens. Additionally, user data detected by IoT system 120 may be stored in database 136, as well as determinations of whether a user is likely to process a transaction within an imminent future time.

In various embodiments, service provider server 130 includes at least one network interface component 138 adapted to communicate user device 110, IoT system 120, merchant device 150, and/or another device/server for a merchant over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant device 150 may be implemented using any appropriate hardware and software configured for wired and/or wireless communication with user device 110, IoT system 120, and/or service provider server 130 for processing a transaction using a token issued through IoT system 120. Merchant device 150 may correspond to a merchant that provides sales through a physical merchant location. In various embodiments, merchant device 150 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although only one merchant device is shown, a plurality of merchant devices may function similarly.

Merchant device 150 of FIG. 1 contains a sales application 152, other applications 154, a database 156, and a communication module 158. Voice detection application 120, sales application 152, and other applications 154 may correspond to executable processes, procedures, and/or applications with associated hardware. In other embodiments, merchant device 150 may include additional or different software as required.

Sales application 152 may correspond to one or more processes to execute modules and associated devices of merchant device 150 to provide a convenient interface to permit a merchant for merchant device 150 to enter, view, and/or process items the user wishes to purchase using a token generated through IoT system 120. In this regard, sales application 152 may correspond to specialized hardware and/or software utilized by merchant device 150 that may provide transaction processing through the token issued for financial information associated with user device 110 by IoT system 120 when a user is detected as within a purchasing experience and likely to engage in transaction processing. Thus, sales application 140 may be implemented as an application having a user interface enabling the merchant to enter and/or view the items a user associated with user device 110 has selected for purchase (e.g., at a merchant location for the merchant, for example, items brought to a checkout register for the merchant and/or requested to be produced by the merchant). Sales application 152 may further enable the merchant to enter coupons and/or discounts for the items, edit the order including adding, removing, and/or modifying items, or other functions with regards the selected items in the purchase order. Once the items have been finalized for purchase by the user, a total may be calculated and a transaction may be engaged with the user to complete payment for the selected items, for example, through a received token issued using IoT system 120. Thus, sales application 152 may request payment covering the selected items from the user using the token. Transaction processing to receive a payment may be processed by service provider server 130, which may process the token for the user's financial information to provide payment for the transaction to an account of the merchant. Sales application 152 may alert the merchant when payment for the transaction for the item(s) is completed and may provide a transaction history to sales application 152 for generating a receipt to the user associated with user device 110.

Merchant device 150 includes other applications 154 as may be desired in particular embodiments to provide features to merchant device 150. For example, other applications 154 may include security applications for implementing client-side security features, programmatic client applications for interfacing with appropriate application programming interfaces (APIs) over network 160, or other types of applications. Other applications 154 may also include email, texting, voice and IM applications that allow a merchant to send and receive emails, calls, texts, and other notifications through network 160. In various embodiments, other applications 154 may include financial applications, such as banking, online payments, money transfer, or other applications associated with a payment provider, such as service provider server 130. Other applications 154 may contain software programs, executable by a processor, including a graphical user interface (GUI) configured to provide an interface to the user.

Merchant device 150 may further include database 156 which may include, for example, identifiers such as operating system registry entries, cookies associated with sales application 152 and/or other applications 154, identifiers associated with hardware of merchant device 150, or other appropriate identifiers, such as identifiers used for payment/user/device authentication or identification. Identifiers in database 156 may be used by a payment/service provider to associate merchant device 150 with a particular account maintained by the payment/service provider. Database 156 may also further store received tokens used for transaction processing that may be issued by IoT system 120.

Merchant device 150 includes at least one communication module 158 adapted to communicate with user device 110, IoT system 120, and/or service provider server 130 over network 160. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
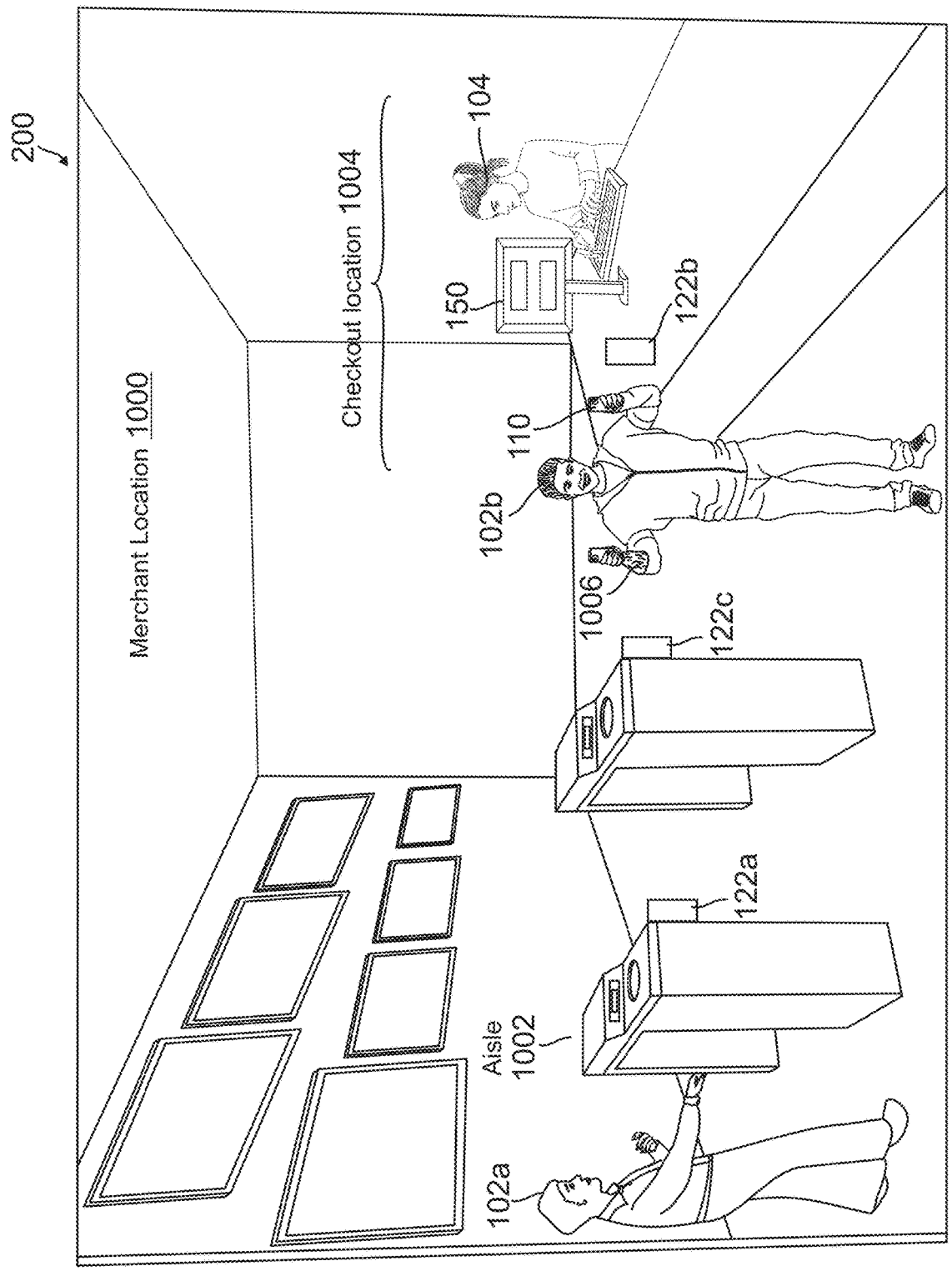
FIG. 2 is an exemplary real-world environment where a user may be issued a token for data when the user is detected as engaging in a transaction with a merchant through a network of data sensor, according to an embodiment.

FIG. 2 is an exemplary real-world environment where a user may be issued a token for data when the user is detected as engaging or about to engage in a transaction with a merchant through a network of data sensor, according to an embodiment. Environment 200 of FIG. 2 includes user device 110 and a merchant device 140 discussed in reference to system 100 of FIG. 1. Additionally, environment 200 includes a sensor 122a, a sensor 122b, and a sensor 122c managed by a networked system of sensors, such as IoT system 120 having sensor 122 in system 100 of FIG. 1. In this regard, user device 110 may engage in electronic transaction processing with merchant device 140 using a token issued to user device 110 for financial information stored on user device 110. The token may be issued in response to one or more of sensors 122a-c detecting that a user 102b associated with user device 110 is likely to engage in transaction processing based on user data captured for user 102a.

In environment 200, a merchant provides sales through a merchant location 1000, which may items available from aisle 1002 and that can be purchased at a checkout location 1004. For example, a user 102a my view one or more items available in merchant location 1000 from aisle 1002 and may shop through merchant location 1000. Sensor 122a may detect that user 102a is shopping, however, user 102a may not immediately be purchasing an item and/or likely to checkout and pay for an item. For example, sensor 122a may detect that user 102a is just browsing items and therefore not likely to checkout soon for the item (e.g., if the user is just looking at items, does not have an item for purchase in their possession, or is discussing item details with another user or merchant employee). Thus, sensor 122a may not tokenize financial data for user 102a as user 102 is unlikely to need a token in the immediate future and/or unlikely to purchase an item, which saves computing resources by minimizing the chances the token will not be needed. In some embodiments, the IoT system associated with sensor 122a may delay tokenization of data until user 102a is ready for checkout and/or likely to purchase an item. However, user 102a may also be detected as picking up an item and placing the item in a cart or otherwise indicating that user 102a may purchase an item, such as if the user is discussing item purchase with another user or merchant employee. In such embodiments, sensor 122a may detect that user 102a is likely to purchase the item, and may begin tokenizing financial data for the user by retrieving the financial data from a device or server associated with user 102a and processing the financial data with a token service provider. In other embodiments, a token may be generated for financial data of user 102a even though user 102a may not be immediately in a purchasing experience and likely to perform electronic transaction processing with merchant device 140. For example, user 102a may be detected within merchant location 1000 by sensor 122a and/or another sensor or geo-location data, and user 102a's financial data may be tokenized due to user 102a's location within merchant location 1000.

However, user 102b may approach checkout location 1004 with an item 1006 that user 102b wishes to purchase. User 102b may select the item for purchase at merchant location 1000 and wish to engage in transaction processing with merchant device 150. However, user device 110 may not have a data token used for transaction processing that is accepted by merchant device 150. Thus, an IoT system using sensors 122a-c may detect that user 102b is likely to engage in transaction processing based on a location of user 102b at checkout location 1004, voice data of user 102b, a movement or action of user 102b, a proximity of user 102b and/or user device 110 to merchant device 150 or one or more of sensors 102b-c, or other user data. For example, user 102b may be likely to engage in the transaction based on having item 1006 in their possession while located at checkout location 1004 and being in proximity to sensor 122b and/or merchant device 150. The IoT system may determine that the user data indicates that user 102b wishes to initiate a transaction and perform processing with merchant device 150, such as by meeting one or more triggers for tokenization of data. Thus, the IoT system may determine that user 102b requires the data token for their financial information to engage in transaction processing, for example, by querying user device 110 through sensors 122a-c or another communicator for available tokens and financial data stored to user device 110.

If the IoT system determines that user device 110 requires the token, the IoT system may request financial information stored on or available using data on user device 110, such as payment card or other funding source information, another token that identifies the financial information with another token service provider, etc. The query may be sent using sensors 122a-c and/or another communicator, which may further validate that IoT system is not fraudulent and associated with a token service provider using an authentication token, certificate, or other data. User device 110 may validate the IoT system based on the request, and may respond to the IoT system with the financial information. The IoT system may then tokenize the financial information using a token service provider by transmitting the financial information to the token service provider and receiving an issued token for the financial information. The IoT system may then store the token for use by user 102b during electronic transaction processing for item 1006.

When user 102b is ready for checkout, user 102b may approach or engage with merchant device 150. The token stored by the IoT system may be pushed to user device 110 and/or merchant device 150 for transaction processing. Where the token is pushed to merchant device 150, the token may be stored with a user and/or device identifier associated with user device 110 to allow for token retrieval during transaction processing. For example, a user identifier may include a name, driver license, credit/debit card identifier, or other identifier that a user may easily pass or provide to merchant device 150 for identification of the stored token. A device identifier for user device 110 (e.g., a phone number, unique universal identifier (UUI), or other device identifier) may also be retrieved during token issuance and stored to merchant device 150 so that when user device 110 connects with merchant device 150, the stored token may be retrieved and applied to a transaction. User device 110 and/or merchant device 150 may generate transaction data for the transaction for item 1006, and may apply the token to the transaction when requesting transaction processing from a token and/or payment service provider. The token may be used to reference user 102b's financial data during transaction processing. Thus, the financial data may be processed using the token to retrieve the data from a tokenization system. A payment may then be made to the merchant, and user device 110 and/or merchant device 150 may receive a transaction history to document transaction processing.

Figure 3:
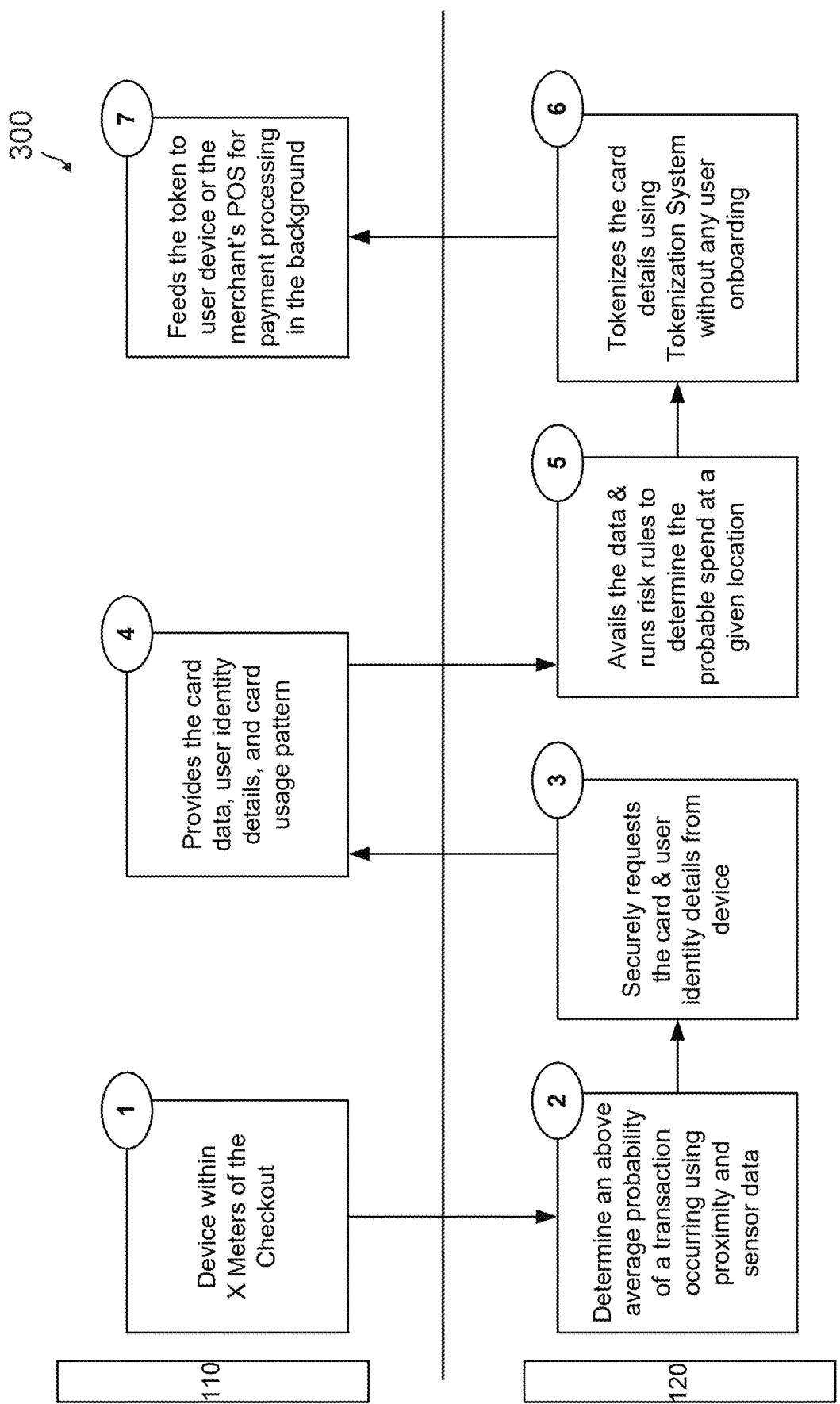
FIG. 3 is a flowchart of an exemplary process for issuing a token based on detecting that a user is engaging in a transaction through networked sensors, according to an embodiment.

FIG. 3 is a flowchart of an exemplary process for issuing a token based on detecting that a user is engaging in a transaction through networked sensors, according to an embodiment. Flowchart 300 of FIG. 3 includes user device 110 and IoT system 120 discussed in reference to system 100 of FIG. 1. Flowchart 300 presents an exemplary process to tokenize data through a system of networked sensors when tokenization is required for sensitive data, such as financial data using in transaction processing.

At step 1 of flowchart 300, the process begins by detecting that a user is within a certain distance from and/or moving towards a checkout location, such as a checkout device that provides NFC payments through device-to-device communications of tokenized payment data. This may be done by detecting a location of user device 110, direction/rate of travel of user device 110, and/or that user device 110 is within proximity to the checkout location, such as through short range wireless communications, signal triangulation, directional data, and/or received signal strength indicator based on communications between user device 110, IoT system 120, and/or another device or communicator. Additionally, other data of the user associated with user device 110 may be used as a trigger to determine that the user is likely to engage in transaction processing, such as movements or actions, voice data, data on user device 110, and/or items in possession of the user.

After the trigger for data tokenization occurs, at step 2, the IoT system determines that there is an above average or threshold level that a transaction may occur using the proximity data of user device 110 to the checkout location and additional sensor data. This may include determining or calculating a score based on the collected sensor data and determining whether the score triggers a data tokenization process. In other embodiments, particular user data or actions may be sufficient to trigger the tokenization of data, such as if the user brings out user device 110, launches a payment or merchant application, or otherwise indicates that the user will process the transaction. In response to determining a transaction is likely to be imminent and user device 110 will be used for processing the transaction, at step 3, the IoT system securely requests for card and user identity information from a data cache of user device 110, which may include a request of the user's preferred funding source details. The funding source data or other financial data may be requested through a background operation that does not require user affirmation and/or input so that a token may be generated without requiring a user to execute some processes on user device 110. Additionally, the request may validate IoT system 120 to user device 110 so that user device 110 knows to trust IT system 120 for data tokenization and processing of financial data securely.

In response to the request, user device 110 may provide the funding source data, user identity or personal information, and funding source usage patterns, such as a funding source for use and/or rewards/benefits available for the payment cards, at step 4. The provided financial data may be used to determine one or more funding sources to tokenize in the provided financial information and may also be used to select a token service provider for the data tokenization. At step 5, IoT system 120 may process the data, perform any data transformations, and run risk rules to determine an amount and other limitations on a data token generated using the received financial data. The risk rules may limit the token in usage and may also be used to determine a token service provider based on the particular requirements for transaction processing between user device 110 and a merchant device.

At step 6, IoT system 120 may generate a token based on the card details using a tokenization system and service provider. This may be done without requiring onboarding of the user or that the user be onboarded with the tokenization system. In some embodiments, this process may also provide onboarding with the tokenization system so that user device 110 may more easily receive data tokens for electronic transaction processing in future instances. IoT system 120 may further obtain the token in time for processing with a transaction and may do so based on the determined limitations. Additionally, the token may be one of a plurality of tokens for multiple payment cards availed from user device 110, such as two or three funding sources. Each funding source may receive a token with separate, but similar or different limitations based the risk rules. Once the token is received, the token may be fed to user device 110 and/or a merchant device using NFC or other wireless communications by IoT system 120 in the background and without onboarding the user for the tokenization system. However, the token may be provided through secure channels and secure tokenization system to provide the benefits of data security during tokenization.

Figure 4:
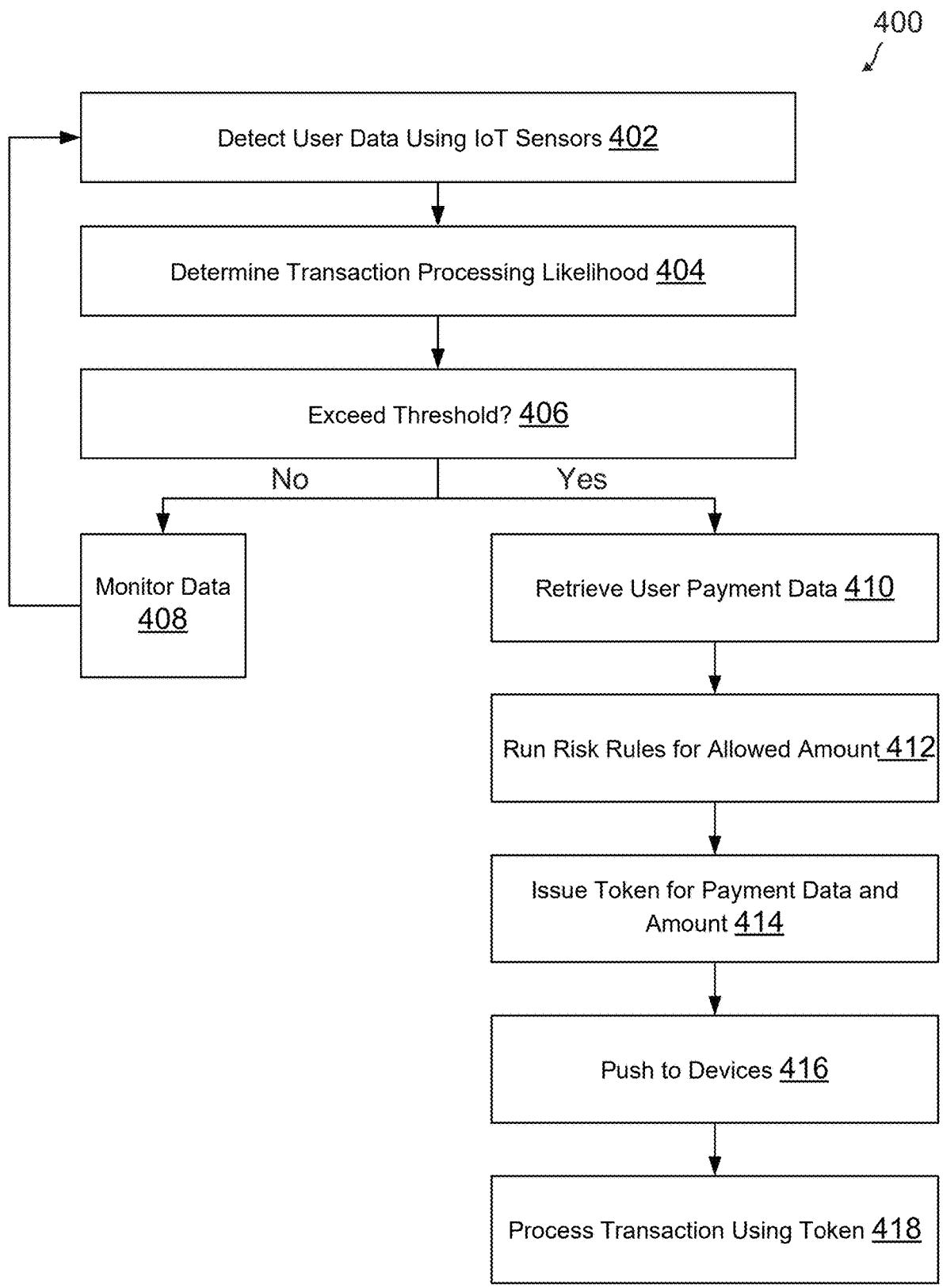
FIG. 4 is a flowchart of an exemplary process for automated data tokenization through networked sensors, according to an embodiment.

FIG. 4 is a flowchart of an exemplary process for automated data tokenization through networked sensors, according to an embodiment. Note that one or more steps, processes, and methods described herein of flowchart 400 may be omitted, performed in a different sequence, or combined as desired or appropriate.

At step 402 of flowchart 400, user data is detecting using IoT sensors, such as cameras, motion or proximity sensors, microphones or audio sensors, wireless communicators, and/or other sensors that may detect user/device presence, location, proximity range, and/or actions. The user data may be used to determine whether the user is in a buying or purchasing experience, such as a likelihood that the user will engage in electronic transaction processing with a merchant. For example, the user data may include where the user is located in a merchant location, rate and/or direction of travel, and whether the user has items in their possession or is requesting items that the user may purchase (e.g., through voice data, motions, etc.). The user may also be detected as within a proximity to items at the merchant location, which may include being within a proximity to items in a digital shopping list or that the user purchases in certain time intervals (e.g., monthly, with the item being last purchased a month ago). Other purchasing patterns may also be used to determine that the user may purchase the item, such as seasonal items, items required for new purchases (e.g., batteries, computer accessories, etc.). At step 404, a transaction processing likelihood is determined using the user data, which may include determining that the user data meets or exceeds a probability threshold for determination that the user is likely to engage in electronic transaction processing. The processing likelihood may also be based on specific user data, such as detecting the user/device of the user within a distance to a checkout location or device and/or that the user is in possession of items for purchase.

Thus, the system may determine whether the user data exceeds a threshold and/or requirement for transaction processing likelihood, at step 406. If the user data does not exceed a threshold requirement for determining that the user is likely to engage in transaction processing, at step 408, the user data is continued to be monitored using the IoT devices and flowchart 400 may return to step 402 where the user data is detected using IoT sensors. However, if the threshold is exceeded, flowchart 400 may proceed to step 410, where user payment data is retrieved for the user. In some embodiments, step 410 may require that funding source or other financial data is requested directly from a user device based on stored payment mechanisms and data by an IoT component, such as a wireless communicator. The funding source data may be stored with one or more applications on the device, and may include funding source usage rewards, statistics, patterns, and/or preferences. The device may select a most used or preferred funding source based on the information, or may provide all payment data to the IoT component for use with risk rules and selection criteria. In other embodiments, the device of the user may provide a token for a particular token service provider that stores and tokenizes the user's financial data, where the IoT system may request and retokenize the financial data and/or token with another token service provider for processing.

After the IoT system receives the payment or other financial data (e.g., payment card data for a payment card, such as a card number, expiration data, CCV value, etc.), the IoT system and/or a token service provider may process the data using risk rules to determine an allowed amount, at step 412. In some embodiments, the risk rules may not be availed and processed so that the data may be tokenized without placing limits on the token, such as an allowable spend. The risk rules may determine a maximum allowable spend using a token issued for the financial data, and may also provide other limitations on use, such as by location, time, and/or merchant/transaction. The maximum allowable spend may be based on a risk assessment of the user and/or fraud in tokenizing the user's financial data. The maximum allowable spend may also be based on additional factors, such as items available at the location, merchant average costs at the location, usual or predicted user spend, and/or items the user has interacted with at the location. For example, one or more items may be detected in the user's possession by the user picking up the items and/or placing into a shopping cart by the IoT system A token service provider associated with the IoT system, merchant location, and/or funding source/financial data may then issue a token for the user's data, which may be issued based on the limitations, at step 414. The token may correspond to a randomized data representation of the user's funding source data that prevents other parties from determining and identifying the funding source data without using a tokenization system. Thus, untrusted parties or bad actors are unable to ascertain the funding source data. In this regard, the tokenization system processes the token to refer back to the payment data using a tokenization database and token data tables. This allows the user to engage in transaction processing with a minimal risk of fraud through processing the token with a transaction.

At step 416, the token is stored by the IoT system and/or pushed to devices, such as the user device and/or merchant device. The token may be pushed to devices by an IoT sensor or component nearby the potential transaction in response to detecting transaction initiation and/or generation of transaction data. The token may also be pushed to one or more of the devices when the token is issued and stored by the one or more of the devices for transaction processing. When pushed to a merchant device, the token may be associated with a user and/or user device identifier, which may be provided by the user or their user device during checkout to identify the token, retrieve the token from local storage, and apply the token to a transaction. Thus, at step 418, a transaction may be processed using the token, the token service provider, and/or a payment service provider once the transaction data is generated. The transaction may be processed using existing transaction processing systems and communication channels of the merchant that allow for electronic transaction processing using tokenized data. This process of creating and loading the token may be performed without the user and/or merchant requesting tokenization of data and occurs through a background process so that transaction processing using secure smart tokens and tokenized data may occur immediately and without tokenization requests.

Figure 5:
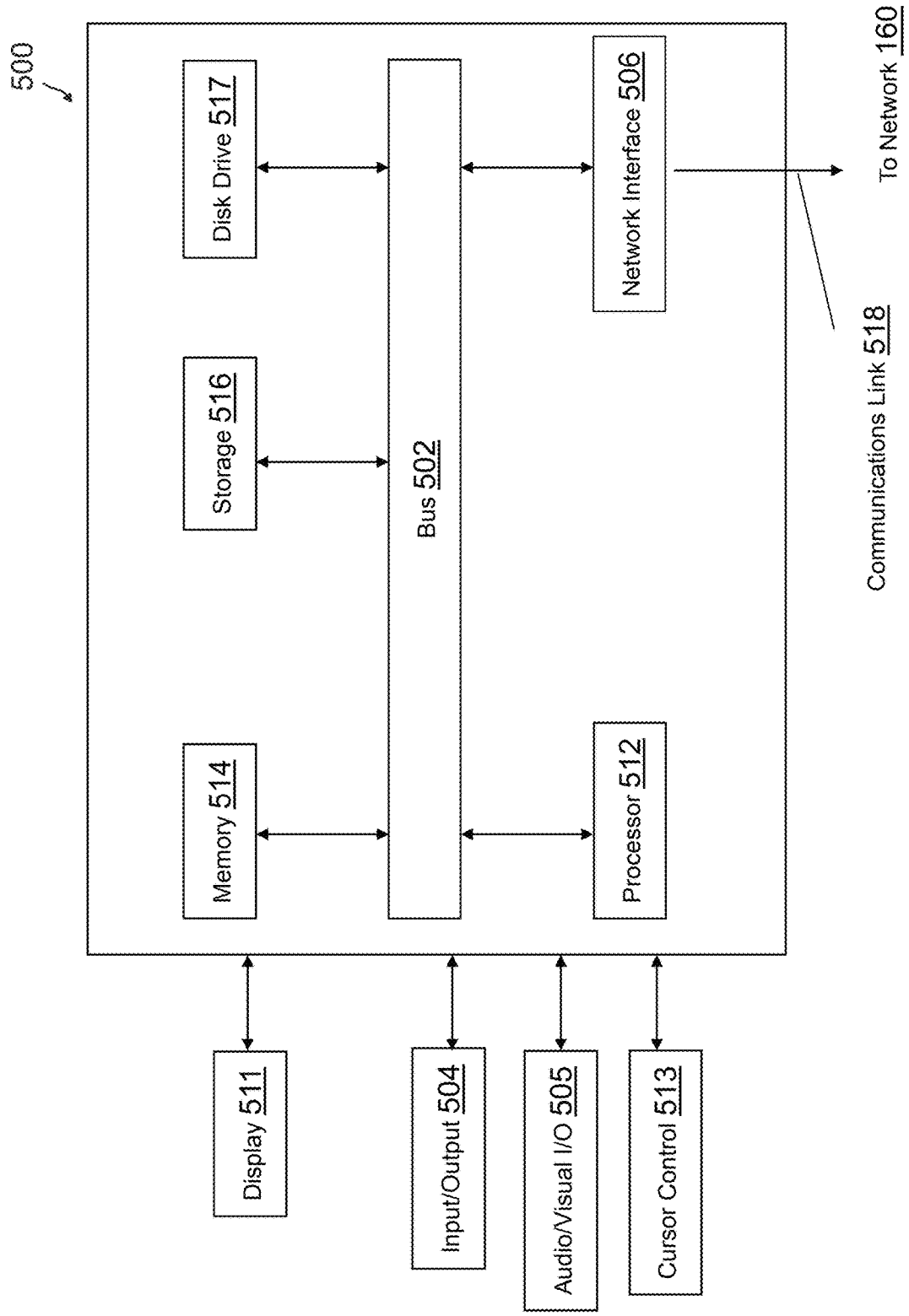
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
one or more hardware processors coupled to the non-transitory memory and configured to read the instructions from the non-transitory memory to cause the system to perform operations comprising:
detecting, via a sensor at a merchant location, that a user is approaching a checkout location of the merchant location, wherein the detecting includes capturing user data from at least one of the sensor or a user device, and wherein the detecting includes accessing a communication transmitted between the user device and the sensor;
computing a likelihood of a checkout of the user at the checkout location based on the user data;
determining that the user data indicates that the user is likely to initiate a transaction at the checkout location based on the likelihood of the checkout meeting or exceeding a threshold for initiating the transaction at the checkout location;
determining a token usable for processing the transaction by the user device with a merchant device at the checkout location; and
storing the token on the user device independent of a user request by the user.

2. The system of claim 1, wherein the communication is transmitted between the user device and the sensor via a background operation performed on the user device, and wherein the storing the token on the user device comprises loading the token to a storage on the user device using the background operation.

3. The system of claim 1, wherein the determining the token comprises:
determining that the user is not onboarded with a service provider corresponding to the system; and
obtaining payment instrument information corresponding to the user,
wherein the operations further comprise:
generating the token for the user based on the payment instrument information.

4. The system of claim 1, wherein the determining the token comprises:
determining that a pre-generated token for the user is not accepted at the merchant location; and wherein the operations further comprise:
retokenizing the pre-generated token to the token for the transaction at the merchant location.

5. The system of claim 1, wherein the operations further comprise:
determining loyalty data corresponding to the user usable at the merchant location; and
loading the loyalty data to at least one of the user device or the merchant device automatically when then the transaction is being processed using the token.

6. The system of claim 1, wherein the operations further comprise:
determining a spending amount corresponding to the transaction; and
performing a risk assessment based on at least the determined spending amount, wherein the token is limited to the determined spending amount.

7. The system of claim 1, wherein the user data comprises at least one of an image of the user, a user location, one or more items in possession of the user, or a digital shopping list of the user.

8. The system of claim 1, wherein the operations further comprise:
transmitting the token to the merchant device automatically in response to detecting that the transaction is being processed at the merchant location.

9. A method comprising:
detecting, via a sensor at a merchant location, a communication between a user device and the sensor, wherein the communication occurs between the user device and the sensor independent of a user initiating the communication on the user device;
determining, via the communication, that the user has initiated a checkout for a transaction at the merchant location;
determining that a likelihood of completing the checkout meets or exceeds a threshold based on data from the communication;
generating a token usable for an electronic transaction processing of the transaction by a merchant device at the merchant location; and
loading the token to the merchant device through a checkout processing operation of the merchant device independent of the user device transmitting the token to the merchant device.

10. The method of claim 9, wherein the communication is transmitted between the user device and the sensor via a background operation performed on the user device, and wherein the method further comprises:
causing the token to be stored by a storage on the user device using the background operation.

11. The method of claim 9, wherein the generating the token comprises:
determining a digital wallet corresponding to the user;
generating the token based on the digital wallet.

12. The method of claim 9, wherein the generating the token comprises:
determining that the user is not onboarded with a service provider; and
obtaining payment instrument information corresponding to the user,
wherein the token is generated based on the payment instrument information.

13. The method of claim 9, wherein the generating the token comprises:
determining that a pre-generated token for the user is not accepted at the merchant location; and
retokenizing the pre-generated token to the token for the transaction at the merchant location.

14. The method of claim 9, further comprising:
determining loyalty data corresponding to the user usable at the merchant location; and
providing the loyalty data to at least one of the user device or the merchant device.

15. The method of claim 9, wherein the determining that the likelihood of completing the checkout meets or exceeds the threshold is further based on at least one of an image of the user, a user location, one or more items in possession of the user, or a digital shopping list of the user.

16. The method of claim 9, wherein the loading the token to the merchant device comprises transmitting the token to the merchant device automatically in response to the determining that the likelihood of completing the checkout meets or exceeds the threshold.

17. A non-transitory machine-readable medium having stored thereon machine-readable instructions executable to cause a machine to perform operations comprising:

receiving, from a merchant device at a merchant location, user data based on a communication between a user device for the user and the merchant device transmitted by the user device that does not require an input by a user to the user device to transmit the communication;

determining, based at least on the user data, transaction initiation information for a checkout by the user at the merchant location;

determining the transaction initiation information corresponds to a likelihood of the checkout that meets or exceeds a threshold;

determining a token usable for an electronic transaction processing between the user device and the merchant device at the merchant location; and causing the token to be stored by at least one of the user device or the merchant device.

18. The non-transitory machine-readable medium of claim 17, wherein the communication is transmitted between the user device and the sensor via a background operation performed on the user device, and wherein the causing the token to be stored comprises loading the token to at least one storage on the at least one of the user device using the background operation or the merchant device using another operation.

19. The non-transitory machine-readable medium of claim 17, wherein the determining the token comprises:
   determining that the user is not onboarded with a service provider; and
   obtaining payment instrument information corresponding to the user,
   wherein the token is generated based on the payment instrument information.

20. The non-transitory machine-readable medium of claim 17, wherein the determining the token comprises:
   determining that a pre-generated token for the user is not accepted at the merchant location; and
   retokenizing the pre-generated token to the token for the transaction at the merchant location.

* * * * *

UNITED STATES PATENT AND TRADEMARK OFFICE
CERTIFICATE OF CORRECTION

PATENT NO. : 12,475,446 B2  
APPLICATION NO. : 18/642794  
DATED : November 18, 2025  
INVENTOR(S) : Pankaj Sarin It is certified that error appears in the above-identified patent and that said Letters Patent is hereby corrected as shown below:

In the Specification

Column 6, Line 36, change "IT system 120 may operate" to --IoT system 120 may operate--.

Column 9, Line 8, change "information by IT system 120." to --information by IoT system 120.--.

Column 18, Line 61, change "knows to trust IT system 120" to --knows to trust IoT system 120--.

In the Claims

Claim 17, Column 25, Line 3, change "device for the user and the merchant device" to --device and the merchant device--.

Signed and Sealed this  
Twenty-third Day of December, 2025

John A. Squires  
*Director of the United States Patent and Trademark Office*